(12) United States Patent
Liu et al.

(10) Patent No.: US 11,402,729 B2
(45) Date of Patent: Aug. 2, 2022

(54) GIMBAL ASSEMBLY AND HANDHELD GIMBAL IMAGING DEVICE

(71) Applicant: SZ DJI TECHNOLOGY CO., LTD., Shenzhen (CN)

(72) Inventors: Yifen Liu, Shenzhen (CN); Qiu Lan, Shenzhen (CN); Dengfeng Hu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/153,221

(22) Filed: Jan. 20, 2021

(65) Prior Publication Data

US 2021/0141296 A1 May 13, 2021

Related U.S. Application Data (63) Continuation of application No. 16/515,509, filed on Jul. 18, 2019, now Pat. No. 10,901,305, which is a continuation of application No. PCT/CN2017/071643, filed on Jan. 19, 2017.

(51) Int. Cl.
| | | |
|---|---|---|
| *G03B 17/56* | (2021.01) | |
| *F16M 11/20* | (2006.01) | |
| *F16M 11/28* | (2006.01) | |
| *F16M 11/10* | (2006.01) | |
| *F16M 13/04* | (2006.01) | |

(52) U.S. Cl.
CPC ....... *G03B 17/561* (2013.01); *F16M 11/2028* (2013.01); *F16M 11/2042* (2013.01); *F16M 11/28* (2013.01); *F16M 11/105* (2013.01); *F16M 13/04* (2013.01); *F16M 2200/02* (2013.01)

(58) Field of Classification Search
None
See application file for complete search history.

(56) References Cited

U.S. PATENT DOCUMENTS

| | | |
|---|---|---|
| 4,946,272 A | 8/1990 | Brown |
| 7,394,978 B2 | 7/2008 | Sukenari et al. |
| | (Continued) | |

FOREIGN PATENT DOCUMENTS

| | | |
|---|---|---|
| CN | 202494852 U | 10/2012 |
| CN | 204005056 U | 12/2014 |
| | (Continued) | |

OTHER PUBLICATIONS

World Intellectual Property Organization (WIPO) International Search Report for PCT/CN2017/071643 dated Oct. 25, 2017 5 pages.
(Continued)

*Primary Examiner* — Leon W Rhodes, Jr.
(74) *Attorney, Agent, or Firm* — Anova Law Group, PLLC (57) ABSTRACT

A gimbal assembly includes a body and a gimbal frame movably connected with the body. The gimbal frame is configured to completely fit with the body or partially fit with the body through a sliding mechanism to reduce a volume of the gimbal assembly. The sliding mechanism includes a first sliding member disposed at the body and a second sliding member disposed at the gimbal frame to match with the first sliding member, such that the gimbal frame slides from an extended position to a receiving position with respect to the body.

18 Claims, 13 Drawing Sheets

(56) References Cited

U.S. PATENT DOCUMENTS

| | | | | |
|---|---|---|---|---|
| 7,563,040 | B2* | 7/2009 | Tsai | G06F 1/1616 396/428 |
| 8,861,189 | B2* | 10/2014 | Chen | G06F 1/1605 348/374 |
| 2001/0051509 | A1* | 12/2001 | Mukai | H04M 1/233 455/550.1 |
| 2011/0064403 | A1 | 3/2011 | Nakano et al. | |
| 2015/0261070 | A1 | 9/2015 | Feng et al. | |
| 2015/0362122 | A1 | 12/2015 | Brown | |
| 2016/0352992 | A1 | 12/2016 | Saika et al. | |

FOREIGN PATENT DOCUMENTS

| | | |
|---|---|---|
| CN | 204213575 U | 3/2015 |
| CN | 105937697 A | 9/2016 |
| CN | 205554624 U | 9/2016 |
| CN | 106015852 A | 10/2016 |
| GB | 2519357 A | 4/2015 |
| JP | H02211779 A | 8/1990 |
| JP | 2004304541 A | 10/2004 |
| JP | 2006330593 A | 12/2006 |
| JP | 2011066598 A | 3/2011 |
| JP | 2014010256 A | 1/2014 |
| JP | 2015177539 A | 10/2015 |
| JP | 2018536118 A | 12/2018 |
| JP | 2019526065 A | 9/2019 |
| WO | 2014107574 A1 | 7/2014 |
| WO | 2016190994 A1 | 12/2016 |
| WO | 2017152666 A1 | 9/2017 |
| WO | 2018001312 A1 | 1/2018 |

OTHER PUBLICATIONS

DC Rainmaker, DJI Mavic Pro In-Depth Review, DC Rainmaker, Published on Dec. 8, 2016 https://www.dcrainmaker.com/2016/12/dji-mavic-pro-in-depth-review.html.

* cited by examiner

FIG. 13

GIMBAL ASSEMBLY AND HANDHELD GIMBAL IMAGING DEVICE

CROSS-REFERENCE TO RELATED APPLICATION

This application is a continuation of U.S. application Ser. No. 16/515,509, filed on Jul. 18, 2019, which is a continuation of International Application No. PCT/CN2017/071643, filed on Jan. 19, 2017, the entire contents of all of which are incorporated herein by reference.

TECHNICAL FIELD

The present disclosure relates to the technical field of gimbals and, more particularly, to a gimbal assembly and a handheld gimbal imaging device.

BACKGROUND

In currently technologies, a gimbal imaging device or a handheld gimbal imaging device can capture stable images in a motion state, and for this reason, it is liked by many users. A handheld gimbal imaging device uses a gyroscope and a motor to enhance the stability of the camera head of the imaging device, such that the images are captured stably with anti-shaking. The primary components of a handheld gimbal imaging device include a gimbal assembly. The gimbal assembly includes multiple types, such as a one-axis gimbal, a two-axis gimbal, or a three-axis gimbal.

Regardless of whether it is a one-axis gimbal, a two-axis gimbal, a three-axis gimbal, or a handheld gimbal imaging device, during the operation, the camera head of the imaging device may be adjusted based on a motion state of the user, such that the camera head of the imaging device is always located at a certain location to capture images, thereby stabilizing the captured images. However, when the gimbal imaging device or handheld gimbal imaging device is in an unused state, the one-axis gimbal, two-axis gimbal, or three-axis gimbal assembly will occupy a relatively large space, which is not convenient for carrying and storage.

SUMMARY

According to an aspect of the embodiments of the present disclosure, a gimbal assembly is provided. The gimbal assembly includes a body and a gimbal frame movably connected with the body. The gimbal frame is configured to fittingly contact the body or to be at least partially received in the body to reduce a volume of the gimbal assembly.

The technical solutions of the embodiments of the present disclosure can have the following advantageous effects: in certain operation state or unused state, in the gimbal assembly and handheld gimbal imaging device of the present disclosure, by disposing the gimbal frame such that the gimbal frame fittingly contacts or is at least partially received in the body, the volume of the gimbal assembly and the handheld gimbal imaging device is effectively reduced.

DETAILED DESCRIPTION OF THE EMBODIMENTS

Example embodiments will be described in detail, with the examples shown in the accompanying drawings. When the following descriptions refer to the drawings, unless otherwise expressed, the same numbers in different drawings refer to the same or similar elements. The implementation methods described in the following embodiments do not represent all of the implementation methods consistent with the present disclosure. Instead, they are only examples of the device and method described in detail in the accompanying claims that are consistent with certain aspects of the present disclosure.

Some embodiments of the present disclosure will be described in detail with reference to the drawings. Various embodiments and features in the embodiments may be combined when there is no obvious conflict.

Referring to FIG. 1-FIG. 13, the present disclosure provides gimbal assemblies 100a, 100b, 100c, including bodies 1a, 1b, 1c, and gimbal frames 2a, 2b, 2c connected with the bodies 1a, 1b, 1c, respectively. The gimbal frames 2a, 2b, 2c and the bodies 1a, 1b, 1c may be movably connected, respectively. The gimbal frames 2a, 2b, 2c may be configured to fittingly contact the bodies 1a, 1b, 1c, respectively, or to be at least partially received in the bodies 1a, 1b, 1c, respectively, to reduce the volume of the gimbal assemblies 100a, 100b, 100c. Detailed descriptions of the gimbal assemblies 100a, 100b, 100c are provided below:

FIG. 1-FIG. 5 show embodiments for configuring the gimbal frame 2a to fittingly contact the body 1a.

Figure 1:
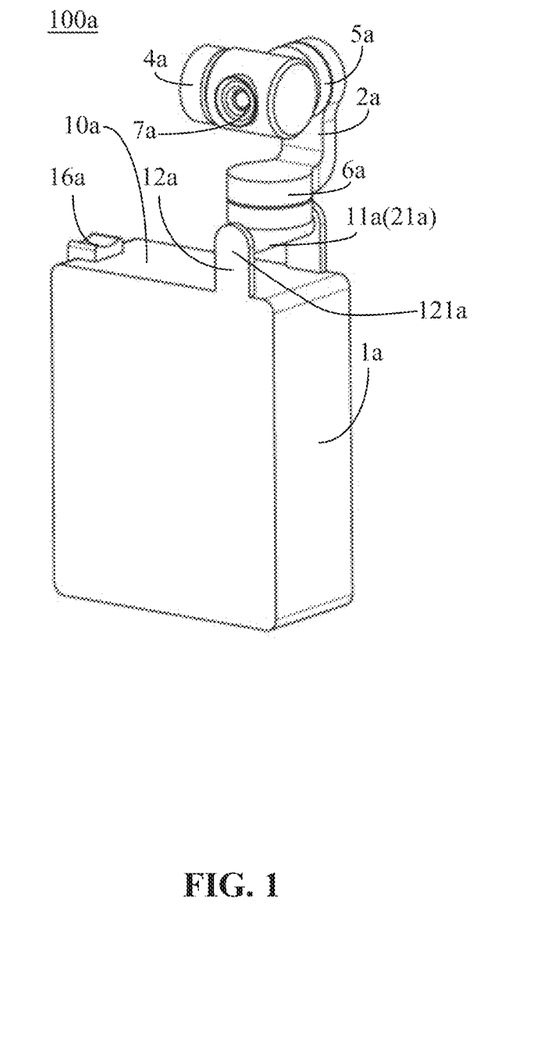
FIG. 1 is a schematic illustration of a structure of a gimbal assembly according to an example embodiment.
Figure 2:
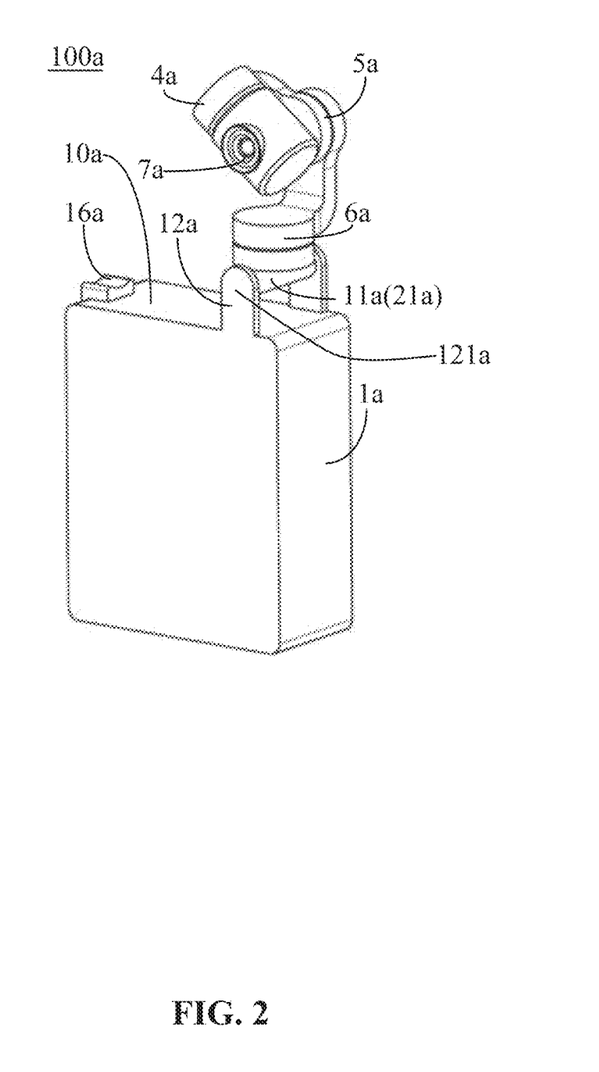
FIG. 2-FIG. 4 are schematic illustrations of the structure of the gimbal frame of the gimbal assembly shown in FIG. 1 during the process of fittingly contacting the body, according to an example embodiment.
Figure 3:
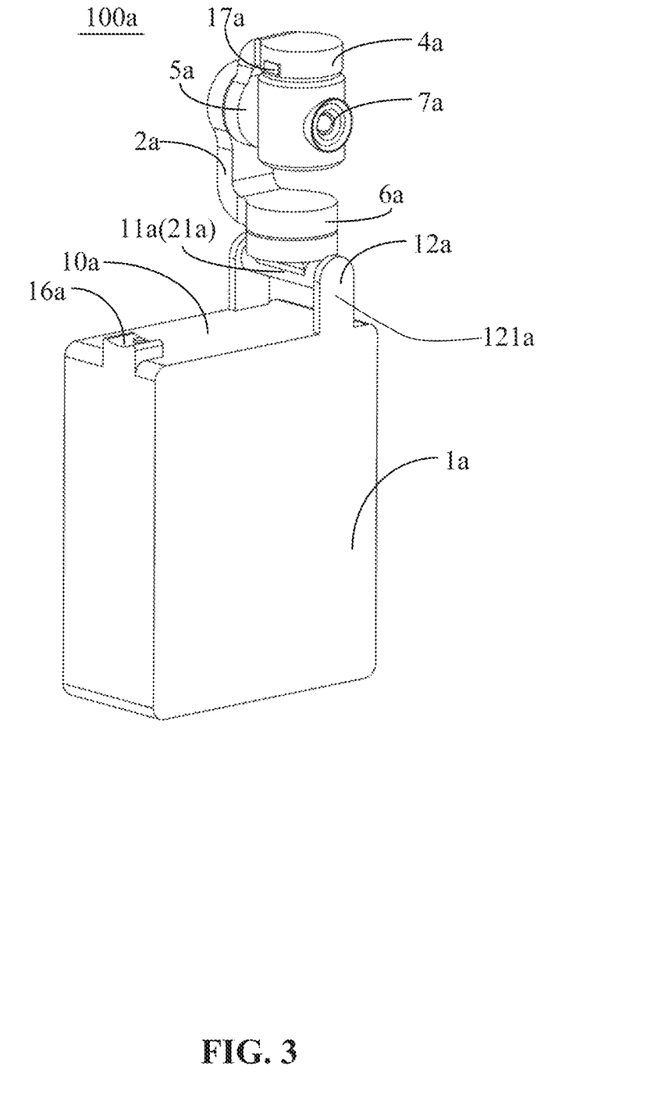

As shown in FIG. 1-FIG. 3, when the gimbal assembly 100a is in a general operation state, the body 1a and the gimbal frame 2a may occupy a relatively large space in the vertical direction. In the state shown in FIG. 5, the gimbal frame 2a may be configured to fittingly contact the body 1a, such that the space occupied by the gimbal frame 2a in the length direction is relatively small, thereby reducing the volume of the gimbal assembly 100a. In an embodiment, in the state shown in FIG. 5, the gimbal assembly 100a may be used for imaging. In another embodiment, in the state shown in FIG. 5, the gimbal assembly 100a may be in an unused state.

In one embodiment, the gimbal assembly 100a may include a rotation shaft 11a. The gimbal frame 2a may be rotatably connected with the body 1a through the rotation shaft 11a, which enables the gimbal frame 2a to rotate and fittingly contact the body 1a.

In some embodiments, the body 1a may be provided with a supporting member 12a coupled with the rotation shaft 11a. The supporting member 12a may be fixed onto the body 1a. The body 1a may include a top surface 10a. In one embodiment, the supporting member 12a may be disposed on the top surface 10a. The supporting member 12a may include two supporting plates 121a that are opposingly disposed and extend perpendicularly from the top surface 10a. The rotation shaft 11a may be disposed between the two supporting plates 121a.

In some embodiments, the gimbal frame 2a may include a mounting member 21a coupled with the rotation shaft 11a. The mounting member 21a may be connected with the rotation shaft 11a, such that the gimbal frame 2a may rotate around the rotation shaft 11a to rotatably connect with the body 1a. Specifically, in one embodiment, the mounting member 21a may sleeve-fit on the rotation shaft 11a. The mounting member 21a may rotate around the rotation shaft Ila. In another embodiment, the mounting member 21a may fixedly connect with the rotation shaft 11a, such that the rotation shaft 11a may rotate on the supporting member 12a. In some embodiments, the rotation shaft Ila and the mounting member 21a may be integrally formed, i.e., the gimbal frame 2a may rotatably mount between the two supporting plates 121a directly through the mounting member 21a.

In other embodiments of the present disclosure, the gimbal assembly 100a may not include the rotation shaft 11a. Other movable connection methods, such as a pivotal connection mechanism or multi-link mechanism may be included in the gimbal assembly 100a to replace the rotation shaft 11a. In some embodiments, the mounting member 21a may be directly rotatably mounted between the two supporting plates 121a to realize the rotation of the gimbal assembly 100a relative to the body 1a. Such equivalent modified embodiments are all included in the protection scope of the present disclosure.

In some embodiments, the body 1a may include a locking mechanism (not shown) configured to lock the gimbal frame 2a, such that the gimbal frame 2a can be locked at an operation location.

The detailed structure of the locking mechanism may be designed based on different needs. For example, the locking mechanism may include at least one of a snap-fit, a pin, or a damping mechanism disposed between the gimbal frame 2a and the body 1a.

The gimbal frame 2a may include a one-axis, two-axis, or multi-axis gimbal frame. In one embodiment, the gimbal frame 2a may include at least a roll-axis assembly 4a. When the gimbal frame 2a fittingly contacts the body 1a, the roll-axis assembly 4a may be configured to rotate to a fittingly contact location. An example of the contact location of the roll-axis assembly 4a is shown in the embodiments shown in FIG. 3-FIG. 5.

Figure 4:
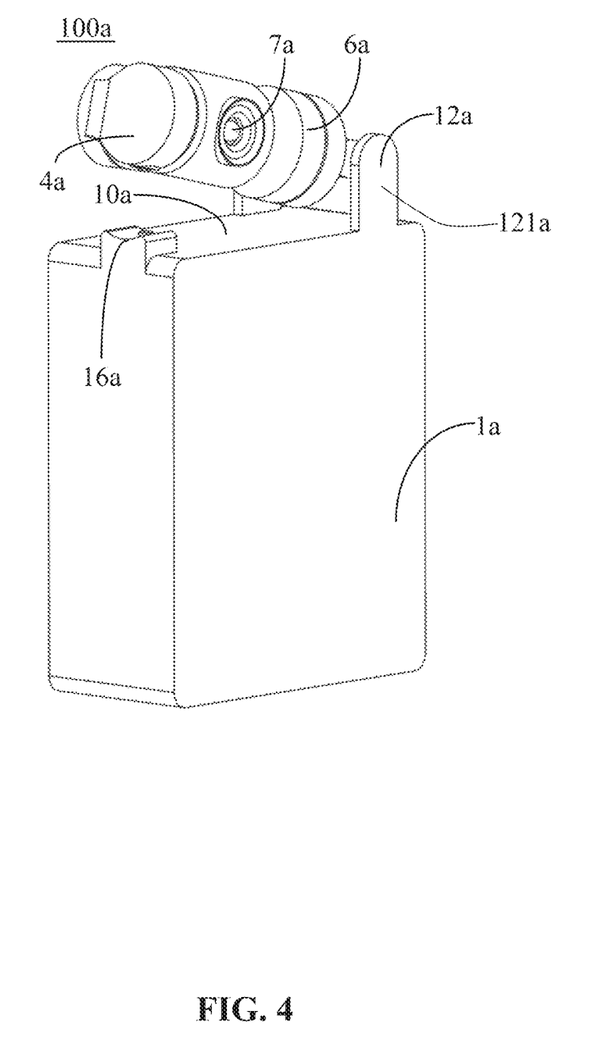

A three-axis gimbal assembly is used as an example in the embodiments shown in FIG. 1-FIG. 5. The gimbal frame 2a may include the roll-axis assembly 4a, a pitch-axis assembly 5a, and a yaw-axis assembly 6a. When in an operation state, the roll-axis assembly 4a, the pitch-axis assembly 5a, and the yaw-axis assembly 6a may be connected in sequence, and may freely rotate relative to one another. FIG. 1-FIG. 3 show the states when the roll-axis assembly 4a rotates clockwise to different angles. In some embodiments, the pitch-axis assembly 5a and the yaw-axis assembly 6a may also be freely rotated based on needs. When the gimbal frame 2a is in the state shown in FIG. 3, the gimbal frame 2a may be pushed to rotate around the rotation shaft 11a to fittingly contact a side surface of the body 1a, as shown in FIG. 4. When the gimbal frame 2a is in the state shown in FIG. 4, the gimbal frame 2a may continue to rotate around the rotation shaft 11a until the state shown in FIG. 5, when the receiving of the gimbal frame 2a is completed.

In some embodiments, the gimbal assembly 100a may also include an imaging device 7a mounted to the gimbal frame 2a. In some embodiments, the roll-axis assembly 4a may be configured to connect with the imaging device 7a.

In one embodiment, the gimbal assembly 100a may include a display screen (not shown). The display screen may be disposed at a side surface of the body 1a, such as the side surface facing against the lens of the imaging device 7a as shown in FIG. 1, to enable a user to observe when capturing images. In some embodiments, the gimbal assembly 100a may include an imaging button (not shown) disposed on the top surface 10a of the body 1a for controlling the imaging device 7a. Through such a configuration, a user may operate the imaging button to capture images in the embodiments shown in FIG. 1-FIG. 4. In another embodiment, the imaging button may be configured to control the imaging device 7a to capture images when the gimbal frame 2a is disposed to fittingly contact the body 1a. In some embodiments, the imaging button may be disposed at a certain side surface of the body 1a, for example, the side surface facing against the lens of the imaging device 7a as shown in FIG. 1, that is, when the gimbal frame 2a fittingly contacts the body 1a, the side surface of the body 1a that faces against the lens of the imaging device 7a. Another example of the side surface may be a side surface that has a relatively narrow width as shown in FIG. 1, i.e., the side surface of the body referred to by the reference numeral 1a in FIG. 1. Through such a configuration, the user may press the imaging button to control the imaging device 7a to capture images in the state shown in FIG. 5.

Figure 5:
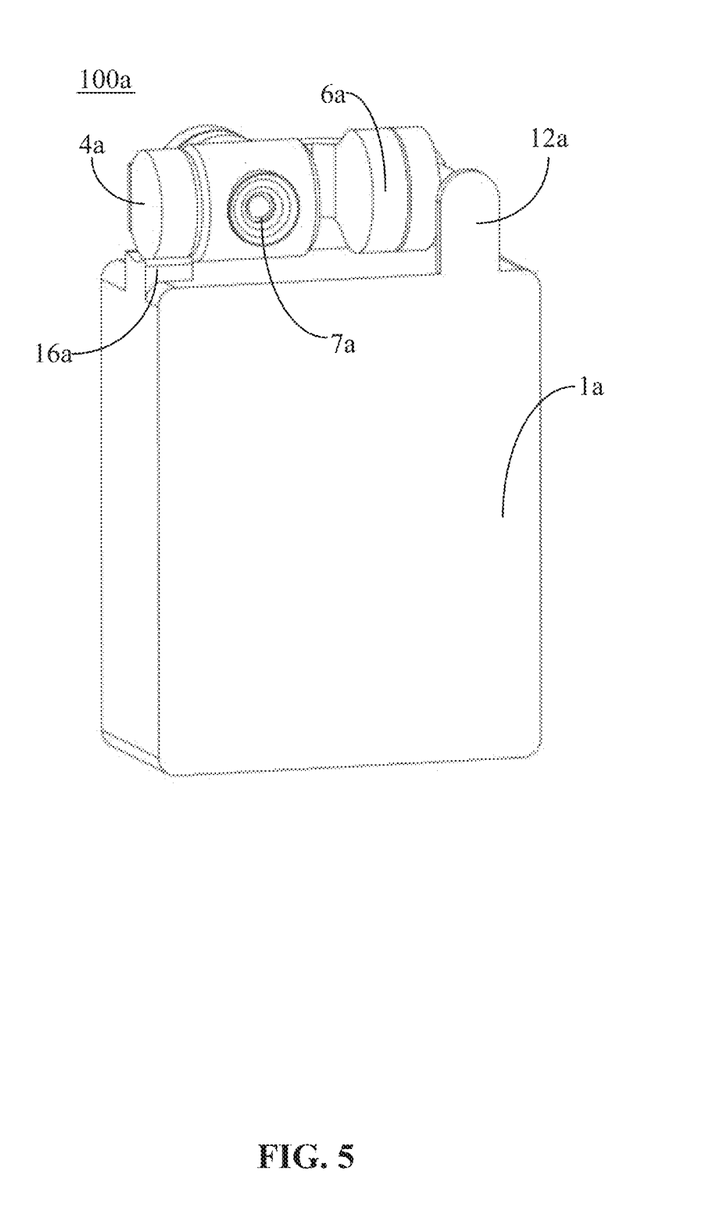
FIG. 5 is a schematic illustration of a structure of the gimbal frame of the gimbal assembly that fittingly contacts the body, according to an example embodiment.

Still referring to FIG. 5, after the gimbal frame 2a is disposed to fittingly contact the body 1a, the gimbal frame 2a may not be locked, and may be easy to shake. To fix the gimbal frame 2a, in one embodiment, the body 1a may be provided with a first fixing member 16a, and the gimbal frame 2a may be provided with a second fixing member 17a coupled with the first fixing member 16a (details are shown in FIG. 3). Through the coupling between the first fixing member 16a and the second fixing member 17a, the gimbal 2a may be fixed to the body 1a after the gimbal frame 2a fittingly contacts the body 1a.

As shown in FIG. 3 and FIG. 5, the first fixing member 16a may be disposed at the top surface 10a of the body 1a and away from an end movably connected with the gimbal frame 2a. The second fixing member 17a may be disposed at the gimbal frame 2a away from an end movably connected with the body 1a. In another embodiment, the fixing member 16a may be disposed at a location on the body 1a closer to the gimbal frame 2a, and the fixing member 17a may be disposed at the gimbal frame 2a closer to an end movably connected with the body 1a. In some embodiments, the first fixing member 16a and the second fixing member 17a may be disposed at different locations based on different embodiments. For example, the first fixing member 16a may be disposed at any side surface of the body 1a, and the second fixing member 17a may be disposed at other locations of the gimbal frame 2a, to realize the purpose of coupling the first fixing member 16a and the second fixing member 17a such that the gimbal frame 2a and the body 1a are fixed relative to one another.

In some embodiments, the first fixing member 16a and the second fixing member 17a may each include at least one of a snap-fitting mechanism, a magnetic attachment mechanism, or a locking mechanism.

When the gimbal frame 2a is to be disposed to fittingly contact the body 1a, the roll-axis assembly 4a may be rotate to the location shown in FIG. 3, such that the second fixing member 17a fittingly fixes with the first fixing member 16a after the gimbal frame 2a rotates. In some embodiments, by operating the gimbal frame 2a, the gimbal frame 2a may rotate in a direction toward the top surface 10a of the body 1a (as shown in FIG. 4), until the first fixing member 16a fittingly fixes with the second fixing member 17a, and the gimbal frame 2a is fittingly disposed at the top surface 10a (as shown in FIG. 5).

After the gimbal frame 2a is disposed to fittingly contact the body 1a, the imaging device 7a may be located external to the body 1a, and may be used for imaging.

Because the gimbal frame 2a may be a one-axis, two-axis, or multi-axis gimbal frame, the shape and structure may be different. Therefore, in other embodiments, when the gimbal frame 2a is disposed to fittingly contact the top surface 10a of the body 1a, the attitude or location of the various structural components of the gimbal frame 2a may be different. But the purpose should be reducing the overall volume of the gimbal assembly 100a. Variations of the attitude or location all fall within the protection scope of the present disclosure.

In another embodiment, a receiving member (not shown) may be formed by depressing at a location where the top surface 10a of the body 1a fittingly contacts the gimbal frame 2a, to realize at least partially receiving the gimbal frame 2a in the receiving member, thereby reducing the volume of the gimbal assembly 100a to the maximum extent.

In the embodiments shown in FIG. 1-FIG. 5, the gimbal frame 2a may fittingly contact the top surface 10a of the body 1a. However, because of the versatility of the product designs, the structure of the body may also change. Therefore, in other embodiments of the present disclosure, after the gimbal frame 2a rotates relative to the body 1a, the gimbal frame 2a may be disposed to fittingly contact a certain side surface of the body 1a, to satisfy the strict limitation on the size in the vertical direction of the body 1a.

FIG. 6-FIG. 13 show the embodiments in which the gimbal frame 2b, 2c are at least partially received or completely received in the body 1b, 1c, respectively.

Next, two embodiments are described to explain the present disclosure: the gimbal frame 2b is at least partially received in the body 1b, and the gimbal frame 2c is completely received in the body 1c.

As shown in the embodiments of FIG. 6-FIG. 10, the gimbal frame 2b may be at least partially received in the body 1b.

The body 1b may include a receiving chamber 3b and a sliding rail 131b. The gimbal frame 2b may include a slidable member 13b coupled with the sliding rail 131b, such that the gimbal frame 2b may move in the receiving chamber 3b. In one embodiment, the sliding rail 131b and the receiving chamber 3b may be connected. In another embodiment, the shape of the sliding rail 131b may be consistent with the external shape of the slidable member 13b.

In some embodiments, the sliding rail 131b may include two rails disposed opposing one another. Correspondingly, the slidable member 13b may include two parts, respectively located on two opposing sides of the gimbal frame 2b. This configuration may enable the slidable member 13b to stably slide in the sliding rail 131b, which facilitates moving the gimbal frame 2b out of or into the receiving chamber 3b. In some embodiments, the sliding rail 131b may include a position limiting member 132b located at two sides of the sliding rail 131b. The slidable member 13b may be provided with a protruding shoulder 133b coupled with the position limiting member 132b, which may avoid the falling out of the slidable member 13b from the sliding rail 131b.

Figure 6:
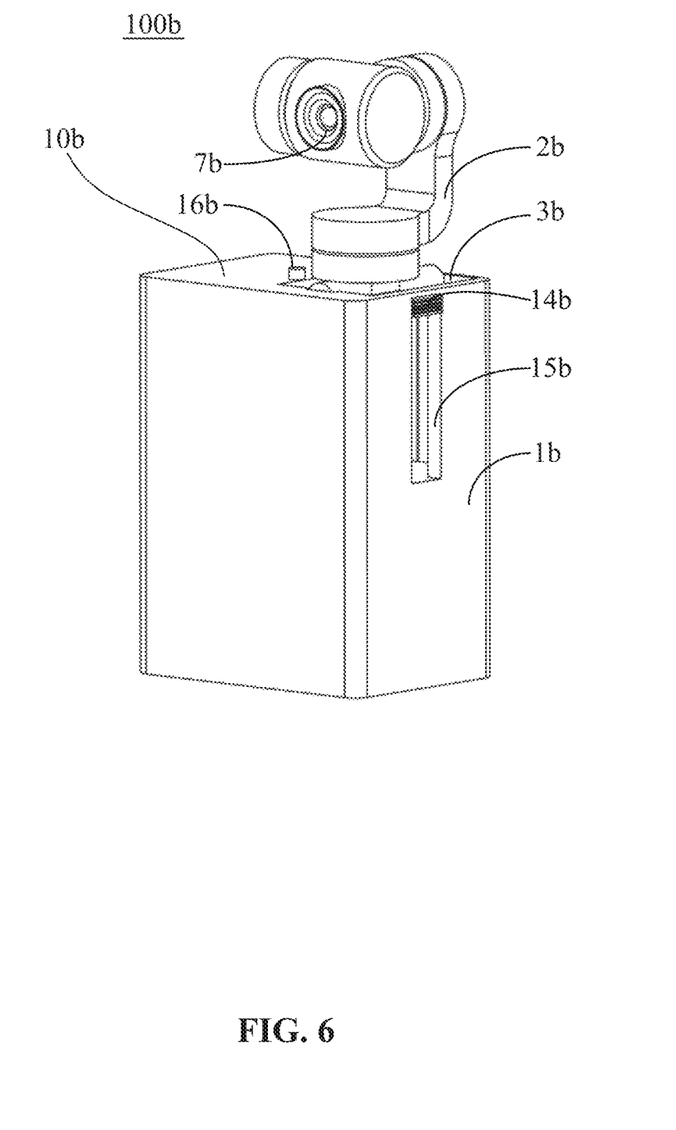
FIG. 6 is a schematic illustration of a structure of the gimbal assembly, according to another example embodiment.
Figure 7:
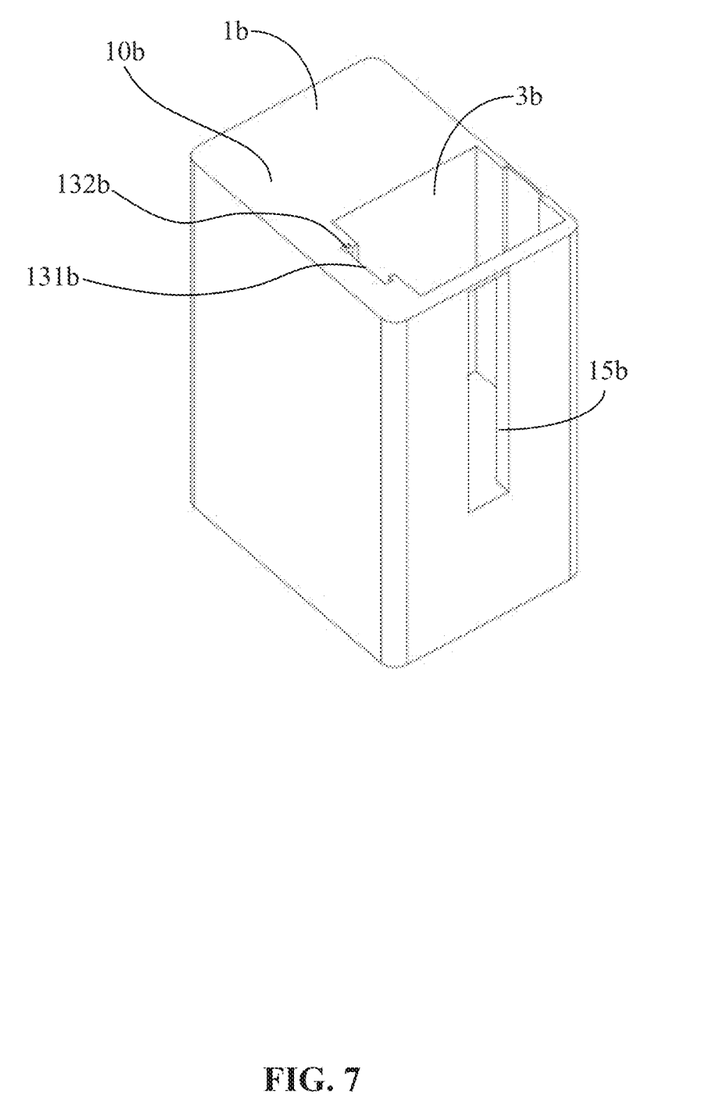
FIG. 7 is a schematic illustration of a structure of the body of the gimbal assembly, according to an example embodiment.
Figure 8:
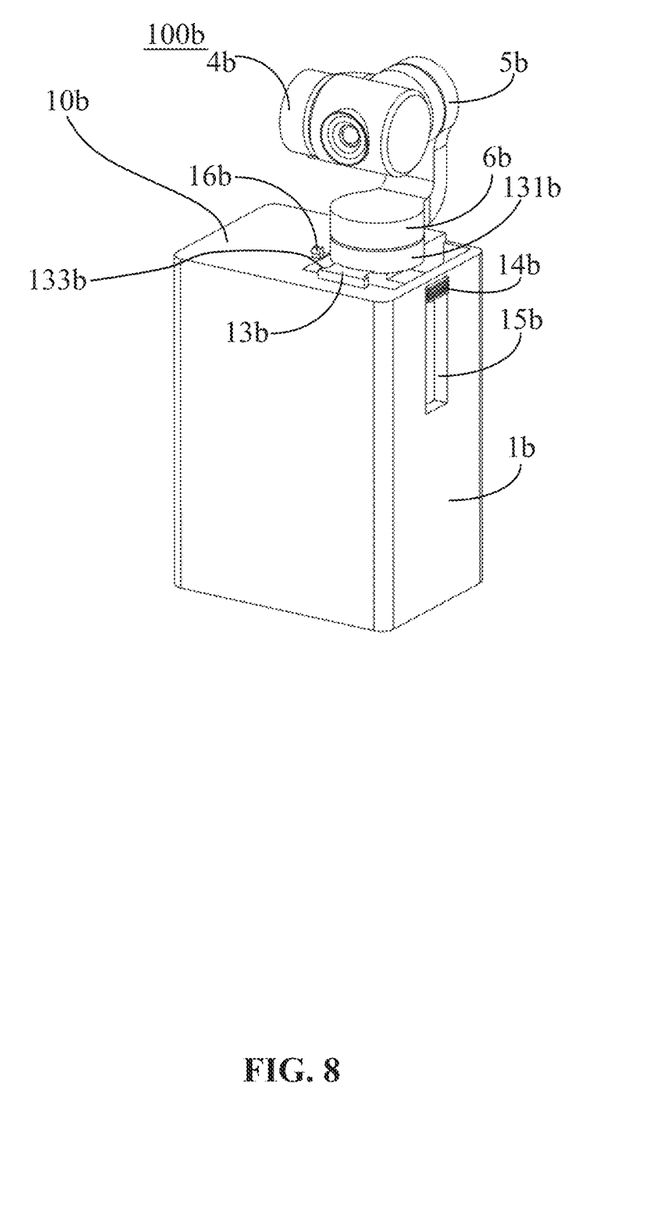
FIG. 8 is a schematic illustration of a structure of the gimbal assembly shown in FIG. 6 from another perspective, according to an example embodiment.
Figure 9:
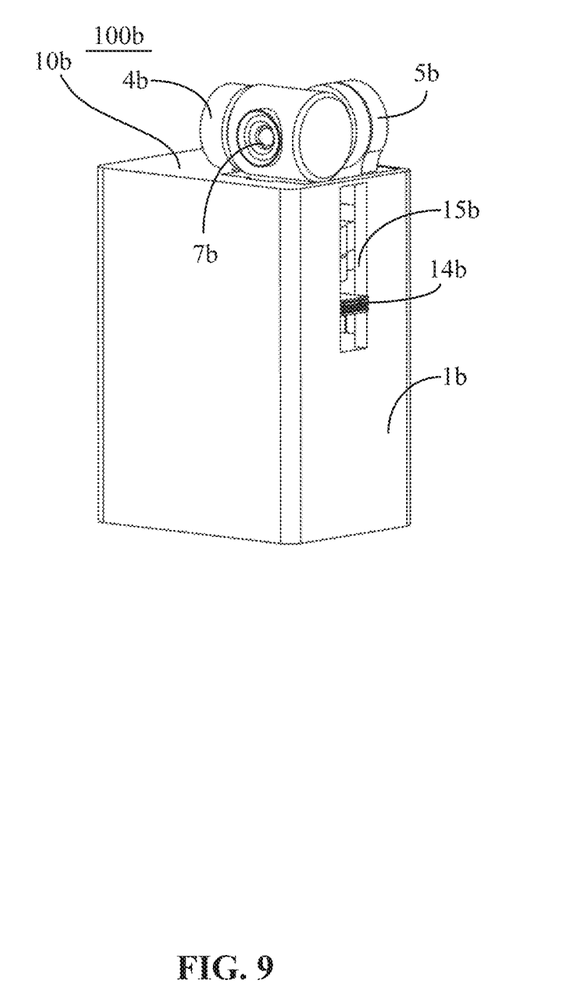
FIG. 9 is a schematic illustration of a structure of the gimbal frame of the gimbal assembly shown in FIG. 6 partially received in the body, according to an example embodiment.
Figure 10:
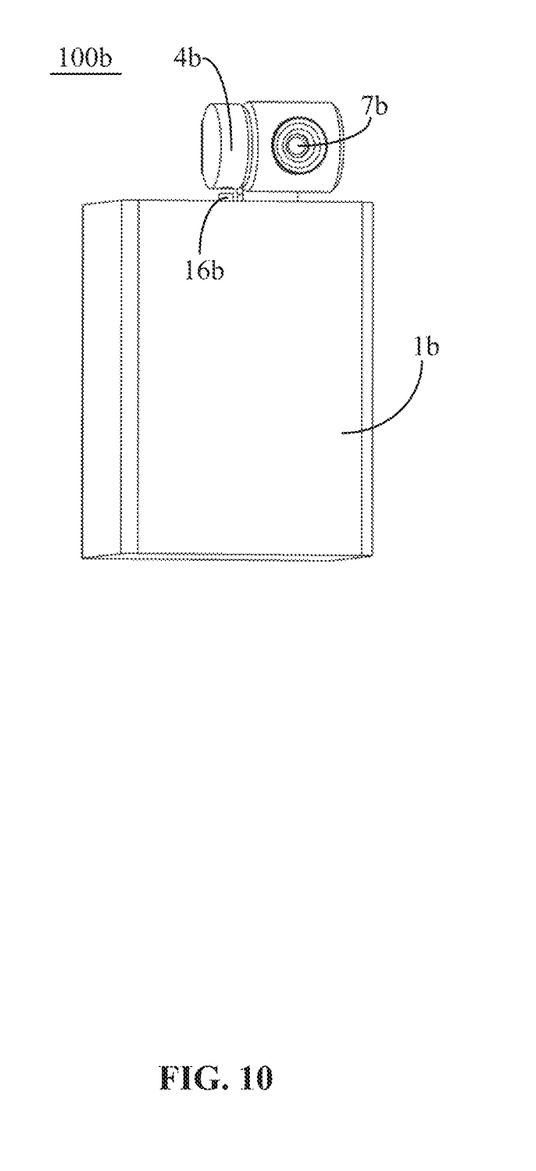
FIG. 10 is a schematic illustration of a structure of the gimbal frame of the gimbal assembly shown in FIG. 6 partially received in the body, as viewed from another perspective, according to an example embodiment.

FIG. 6 and FIG. 8 schematically illustrate the structure of the gimbal frame 2b in a normal operation state. The gimbal assembly 100b may include an operation member 14b. The body 1b may be provided with a sliding groove 15b coupled with the operation member 14b. The operation member 14b may be configured to push the gimbal frame 2b out of or into the receiving chamber 3b. In the state shown in FIG. 6 and FIG. 8, pushing the operation member 14b downwardly causes the gimbal frame 2b to be at least partially received in the receiving chamber 3b (as shown in FIG. 9 and FIG. 10). Conversely, in the state shown in FIG. 9 and FIG. 10, pushing the operation member 14b upwardly may push the gimbal frame 2b out of the receiving chamber 3b (as shown in FIG. 6 and FIG. 8). In one embodiment, the gimbal frame 100b in the state shown in FIG. 9 and FIG. 10 may be used for imaging. In another embodiment, the gimbal assembly 100b in the state shown in FIG. 9 and FIG. 10 may be in an unused state.

The gimbal frame 2b may include a one-axis, two-axis, or multi-axis gimbal frame. In one embodiment, the gimbal frame 2b may include at least a roll-axis assembly 4b. When the gimbal frame 2b is at least partially received in the body 1b, the roll-axis assembly 4b may be rotated to a receiving location. An example of the receiving location of the roll-axis assembly 4b in FIG. 9 and FIG. 10.

The embodiments shown in FIG. 6-FIG. 10 use a three-axis gimbal assembly as an example. The gimbal frame 2a may include the roll-axis assembly 4b, the pitch-axis assembly 5b, and the yaw-axis assembly 6b. In an operation state, the roll-axis assembly 4b, the pitch-axis assembly 5b, and the yaw-axis assembly 6b may be connected in sequence, and may freely rotate relative to one another.

After the gimbal frame 2b is at least partially received in the receiving chamber 3b of the body 1b, the gimbal 2b may not be locked, and may be easy to shake, which may affect the receiving of the gimbal assembly 100b. To fix the gimbal frame 2b, in one embodiment, the body 1b may be provided with a first fixing member 16b, and the gimbal frame 2b may be provided with a second fixing member coupled with the first fixing member 16b. By coupling the first fixing member 16b and the second fixing member, the gimbal frame 2b may be fixed to the body 1b after the gimbal frame 2b is at least partially received in the body 1b.

In one embodiment, the body 1b may include a top surface 10b. The first fixing member 16b may be disposed at the top surface 10b of the body 1b, and adjacent the receiving chamber 3b. The second fixing member may be disposed on the roll-axis assembly 4b. The roll-axis assembly 4b may be configured to rotate to the location shown in FIG. 9 and FIG. 10, such that the first fixing member 16b fittingly fixes to the second fixing member.

In some embodiments, the first fixing member 16b and the second fixing member may be disposed at different locations based on different embodiments. For example, the first fixing member 16b may be disposed at any side surface of the body 1b, and the second fixing member may be disposed at other locations of the gimbal frame 2b, thereby realizing the purpose of coupling the first fixing member 16b and the second fixing member to fix the gimbal frame 2b and the body 1b relative to one another.

In some embodiments, at least one of the first fixing member 16b and the second fixing member may include at least one of a snap-fitting mechanism, a magnetic attachment mechanism, or a locking mechanism.

The gimbal assembly 100b may include an imaging device 7b mounted to the gimbal frame 2b. In some embodiments, the roll-axis assembly 4b may be configured to connect with the imaging device 7b. After the gimbal frame 2b is partially received in the body 1b, the imaging device 7b may be located external to the body 1b, which may be used for imaging.

In one embodiment, the gimbal assembly 100b may include a display screen (not shown). The display screen may be disposed at a side surface of the body 1b, such as the side surface shown in FIG. 6 away from the lens of the imaging device 7b, which may enable the user to observe when capturing images. In some embodiments, the gimbal assembly 100b may include an imaging button (not shown) disposed on the top surface 10b of the body 1b for controlling the imaging device 7b. In another embodiment, the imaging button may be configured to control the imaging device 7b for capturing images when the gimbal frame 2b is at least partially received in the body 1b. The imaging button may be disposed at a side surface of the body 1b, such as the side surface shown in FIG. 6 away from the lens of the imaging device 7b, i.e., when the gimbal frame 2b is partially received in the body 1b, the side surface of the body 1b away from the lens of the imaging device 7b. Another example of the side surface may be a side surface of the body which has a relatively narrow width as shown in FIG. 6, i.e., the side surface of the body located at the location referred to by the reference numeral 1b. Through such a configuration, in the state shown in FIG. 9 or FIG. 10, the user may press the imaging button to capture images.

Figure 11:
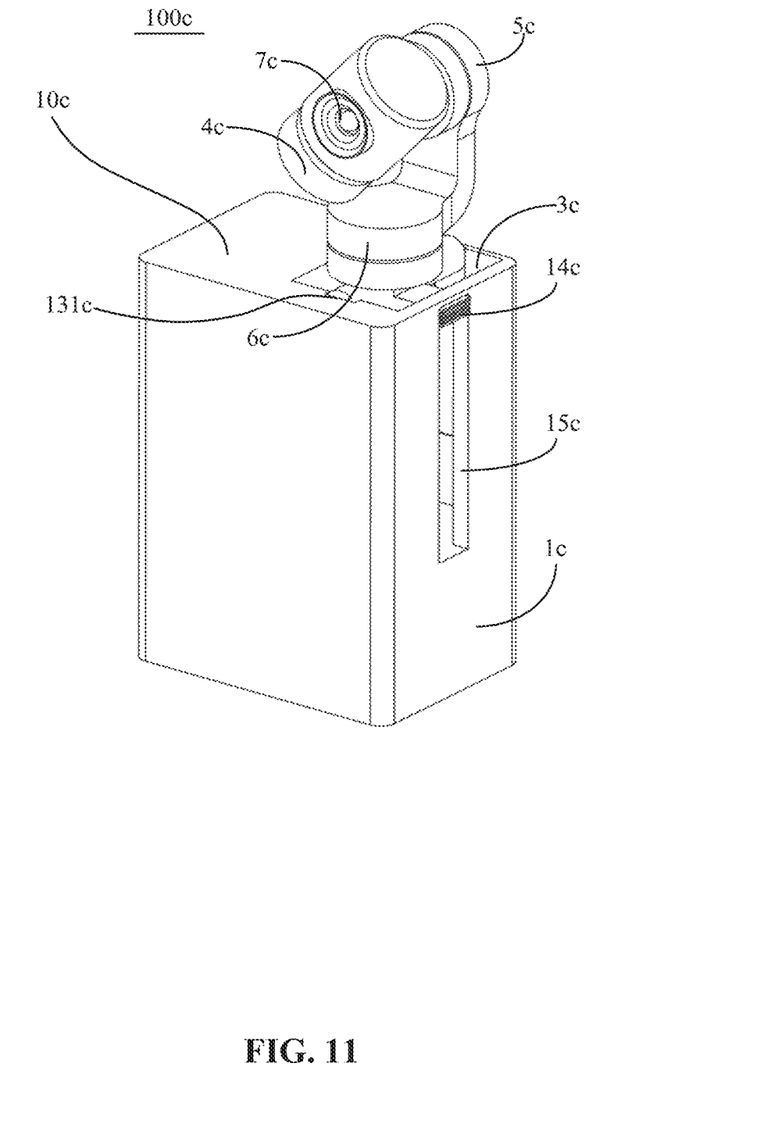
FIG. 11-FIG. 12 are schematic illustrations of the structure of the gimbal assembly in the process of being completely received in the body, according to an example embodiment.
Figure 12:
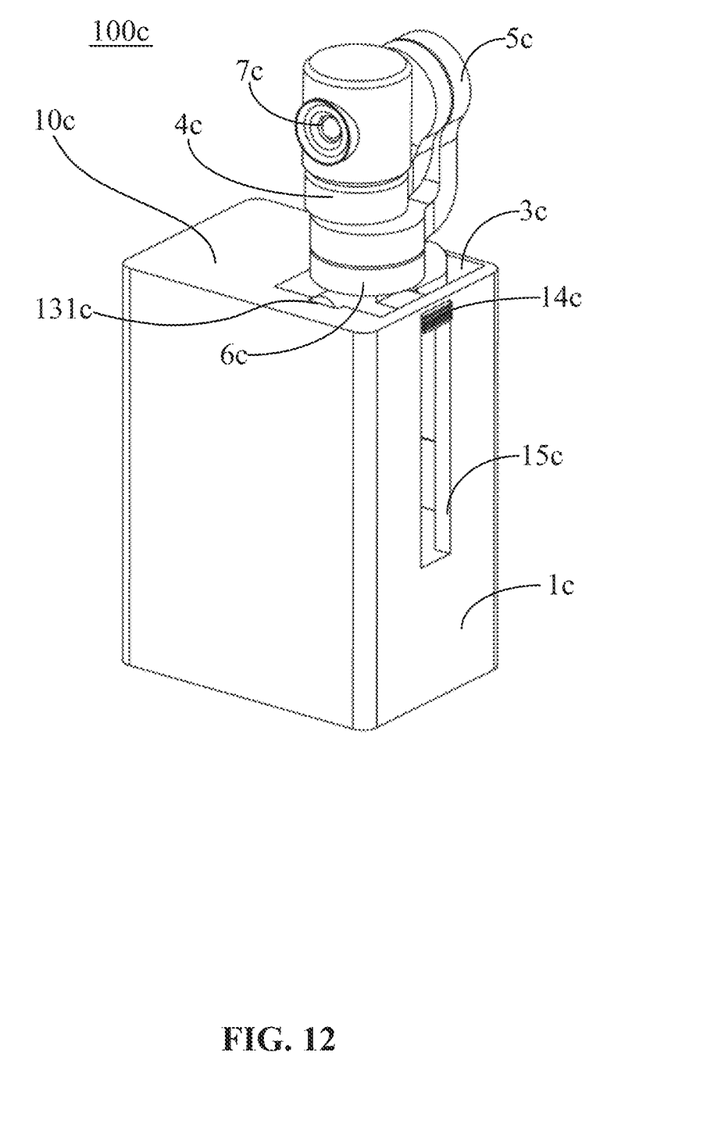
Figure 13:
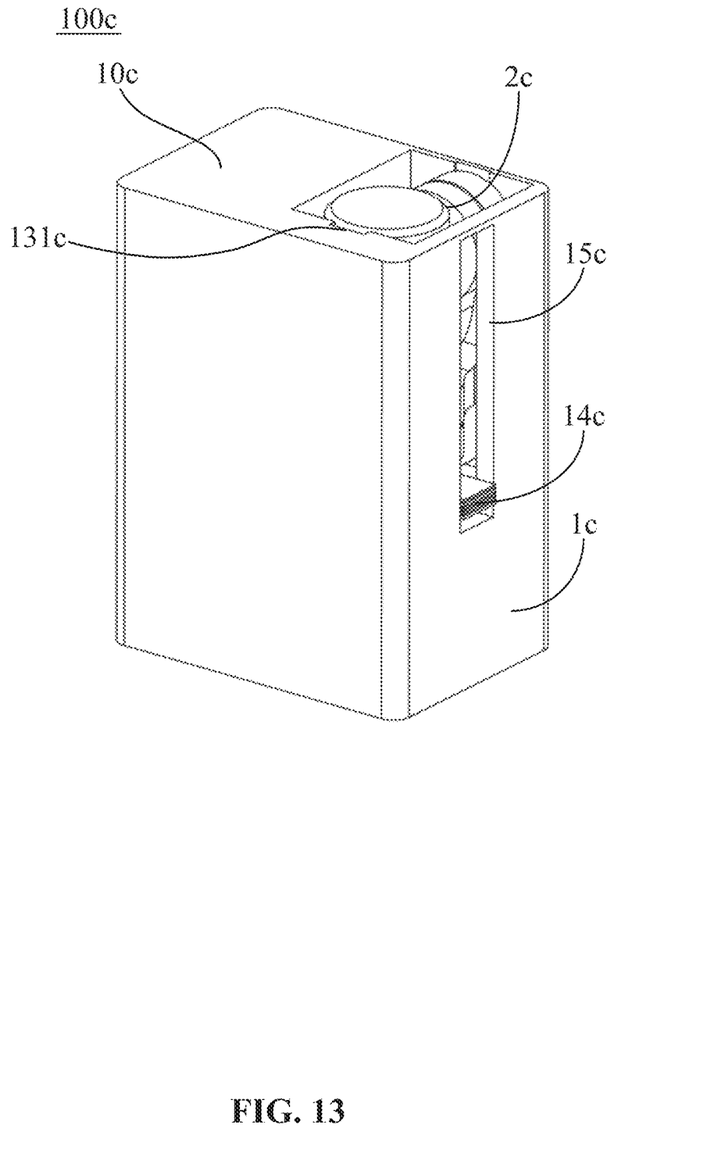
FIG. 13 is a schematic illustration of the structure of the gimbal frame of the gimbal assembly shown in FIG. 11 and FIG. 12, which has been completely received in the body, according to an example embodiment.

In the embodiments shown in FIG. 11-FIG. 13, the gimbal frame 2c may be completely received in the body 1c.

The body 1c may include a receiving chamber 3 and a sliding rail 131c, and the gimbal frame 2c may include a slidable member (not shown) coupled with the sliding rail 131c, to enable the gimbal frame 2c to move in the receiving chamber. In one embodiment, the sliding rail 131c may be connected with the receiving chamber 3c. In another embodiment, the shape of the sliding rail 131c may be consistent with the external shape of the slidable member.

In some embodiments, the sliding rail 131c may include two opposingly disposed rails. Correspondingly, the slidable member may include two parts respectively disposed at two opposing sides of the gimbal frame 2c. Through such a configuration, the slidable member may stably slide in the sliding rail 131c, which may facilitate moving the gimbal frame 2c out of or into the receiving chamber 3c.

In some embodiments, the gimbal assembly 100c may include an operation member 14c. The body 1c may include a sliding groove 15c coupled with the operation member 14c. In the state shown in FIG. 12, pushing the operation member 14c downwardly may push the gimbal assembly 100c completely into the receiving chamber 3c (as shown in FIG. 13). Conversely, in the state shown in FIG. 13, pushing the operation member 14c upwardly may push the gimbal frame 2c out of the receiving chamber 3c (as shown in FIG. 12).

In some embodiments, the gimbal frame 2c may include a one-axis, two-axis, or multi-axis gimbal frame. In one embodiment, the gimbal frame 2c includes at least the roll-axis assembly 4c. When the gimbal frame 2c is completely received in the body 1c, the roll-axis assembly 4c may be configured to rotate to a receiving location (the location where the roll-axis assembly 4c is located in FIG. 12). The operation member 14c may be pushed to slide into the receiving chamber 3c, such that the gimbal frame 2c is completely received in the receiving chamber 3c (as shown in FIG. 13), thereby reducing the volume of the gimbal assembly 100c.

The embodiments shown in FIG. 11-FIG. 13 use a three-axis gimbal assembly as an example. The gimbal frame 2c may include the roll-axis assembly 4c, the pitch-axis assembly 5c, and the yaw-axis assembly 6c. In an operation state, the roll-axis assembly 4c, the pitch-axis assembly 5c, and the yaw-axis assembly 6c may be connected in sequence, and may freely rotate relative to one another.

In some embodiments, the gimbal assembly 100c may fix the gimbal frame 2c through the first fixing member and the second fixing member, thereby avoiding the gimbal frame 2c shaking or falling off from the receiving chamber 3c.

The gimbal assembly 100c may include an imaging device 7c mounted to the gimbal frame 2c. In some embodiments, the roll-axis assembly 3c may be configured to connect with the imaging device 7c.

In one embodiment, the gimbal assembly 100c may include a display screen (not shown). The display screen may be disposed at a side surface of the body 1c, such as the side surface shown in FIG. 11 away from the lens of the imaging device 7c, to enable the user to observe when capturing images. In some embodiments, the gimbal assembly 100c may include an imaging button (not shown) disposed at the top surface 10c of the body 1c for controlling the imaging device 7c. In another embodiment, the imaging button may be configured to control the imaging device 7c for capturing images when the gimbal frame 2c is completely received in the body 1c. The imaging button may also be disposed at a side surface of the body 1c, such as the side surface in FIG. 11 away from the lens of the imaging device 7c. The portion of the lens of the imaging device 7c corresponding to the body 1c may be configured as transparent for the convenience of image capturing by the imaging device 7c.

All of the features of the gimbal assembly 100b described above, even when not explicitly described as being included in the gimbal assembly 100c, may nonetheless be included in the gimbal assembly 100c.

The present disclosure also provides a handheld gimbal imaging device, including a handheld member (not shown) and a gimbal assembly. The gimbal assembly may include a gimbal frame connected with a body. The gimbal frame and the body may be movably connected. The body and the handheld member may be connected, or the body may be a part of the handheld member. The gimbal frame may be disposed to fittingly contact the body or at least partially received in the body, to reduce the volume of the handheld gimbal imaging device. The gimbal assembly may include the above-described embodiments or all of the features of the gimbal assembly described in the above embodiments, which are not repeated.

In some embodiments, the handheld gimbal imaging device may include a fixing end (not shown) configured to fix a display terminal. The display terminal may be a device configured to receive images captured by the imaging device, such as a cell phone or a tablet.

The above described embodiments are only some, but not all, of the embodiments of the present disclosure, and should not be interpreted to limit the scope of the present disclosure. Any modification, equivalent replacement, or improvement made within the spirit and principle of the present disclosure all fall within the protection scope of the present disclosure.

The content of the present application includes materials that are subject to copyright protection. The copyright is owned by the copyright owner. The copyright owner does not object to copying, by any person, the official record from the Patent and Trademark Office, the patent document stored in the application file wrapper, or the disclosure of the patent document.

What is claimed is:

1. A gimbal assembly, comprising:
    a body; and
    a gimbal frame movably connected with the body, and configured to completely fit with the body or partially fit with the body through a sliding mechanism to reduce a volume of the gimbal assembly,
    wherein:
    the sliding mechanism comprises:
        a first sliding member disposed at the body; and
        a second sliding member disposed at the gimbal frame to match with the first sliding member, such that the gimbal frame slides from an extended position to a receiving position with respect to the body; and
    the gimbal frame includes a roll-axis assembly configured to rotate to a receiving position such that when the gimbal frame slides to the receiving position the gimbal frame completely fits with the body,
    an orientation of a roll-axis remaining unchanged when the gimbal frame slides to the receiving position.

2. The gimbal assembly of claim 1, wherein the receiving position is in connection the first sliding member such that the body completely fits with the gimbal frame at the receiving position.

3. The gimbal assembly of claim 1, wherein the first sliding member includes two rails disposed opposing to each other.

4. The gimbal assembly of claim 1, further comprising a yaw-axis assembly connected to the roll-axis assembly wherein the roll-axis assembly and the yaw-axis assembly are configured to freely rotate relative to each another in an operation state of the gimbal frame.

5. The gimbal assembly of claim 1, wherein the second sliding member includes two parts respectively disposed at two opposing sides of the gimbal frame to enable the second sliding member to slide at the first sliding member or enable the gimbal frame to move out of or into the receiving position.

6. The gimbal assembly of claim 1, further comprising:
    an operation member configured to be coupled with a sliding groove of the body.

7. The gimbal assembly of claim 6, wherein the operation member moves downwardly to push the gimbal assembly completely into the receiving position.

8. The gimbal assembly of claim 6, wherein the operation member moves upwardly to push the gimbal frame out of the receiving position.

9. The gimbal assembly of claim 1, wherein:
    the gimbal frame is configured to mount an imaging device; and
    the roll-axis assembly is configured to connect with the imaging device.

10. The gimbal assembly of claim 9, further comprising:
    a display screen disposed at a side of the body away from a lens of the imaging device to display captured images during photographing.

11. The gimbal assembly of claim 9, further comprising:
    an imaging button disposed at a top of the body and configured to control the imaging device to capture images.

12. The gimbal assembly of claim 9, further comprising:
    an imaging button disposed at a side of the body away from a lens of the imaging device and configured to control the imaging device to capture images.

13. The gimbal assembly of claim 9, wherein the imaging device remains at the extended position of the gimbal frame to capture images when the gimbal frame partially fits with the body.

14. The gimbal assembly of claim 1, wherein:
    the body includes a first fixing member; and
    the gimbal frame includes a second fixing member coupled with the first fixing member to lock the gimbal assembly at the receiving position.

15. The gimbal assembly of claim 14, wherein the first fixing member is disposed at a top of the body adjacent to the receiving position of the gimbal frame, and the second fixing member is disposed at the roll-axis assembly.

16. The gimbal assembly of claim 15, wherein the first fixing member couples with the second fixing member when the roll-axis assembly rotates to the end position for the gimbal frame to completely fit with the body at the receiving position.

17. The gimbal assembly of claim 14, wherein the first fixing member and the second fixing member are coupled by one of: a snap-fit, a magnet, or a lock.

18. The gimbal assembly of claim 14, wherein the first fixing member and the second fixing member are disposed at different locations.

* * * * *